(12) United States Patent
Van Gogh (10) Patent No.: US 8,261,238 B2
(45) Date of Patent: Sep. 4, 2012

(54) SHIELD FOR USER INTERFACE TESTING

(75) Inventor: Jeffrey Van Gogh, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1188 days.

(21) Appl. No.: 12/042,019

(22) Filed: Mar. 4, 2008

(65) Prior Publication Data
US 2009/0228987 A1 Sep. 10, 2009

(51) Int. Cl.
*G06F 9/44* (2006.01)
(52) U.S. Cl. ........................................................ 717/124
(58) Field of Classification Search .................. 714/699, 714/718, 733, E11.166, E11.159, 57, 100, 714/48; 715/36, 733, 734; 717/124
See application file for complete search history.

(56) References Cited

U.S. PATENT DOCUMENTS

| | | | |
|---|---|---|---|
| 5,455,904 A * | 10/1995 | Bouchet et al. | 715/798 |
| 5,475,843 A | 12/1995 | Halviatti et al. | |
| 5,596,714 A * | 1/1997 | Connell | 714/38.1 |
| 5,600,789 A | 2/1997 | Parker et al. | |
| 5,602,982 A | 2/1997 | Judd et al. | |
| 5,634,002 A | 5/1997 | Polk et al. | |
| 6,359,631 B2 * | 3/2002 | DeLeeuw | 345/629 |
| 7,055,137 B2 * | 5/2006 | Mathews | 717/125 |
| 7,099,893 B2 * | 8/2006 | Bischof et al. | 717/124 |
| RE41,922 E * | 11/2010 | Gough et al. | 715/803 |
| 7,853,891 B2 * | 12/2010 | Chaudhri et al. | 715/781 |
| 2003/0132965 A1 * | 7/2003 | Santori et al. | 345/763 |
| 2005/0097570 A1 * | 5/2005 | Bomers | 719/318 |
| 2005/0132180 A1 * | 6/2005 | Parker | 713/1 |
| 2005/0172270 A1 | 8/2005 | Dathathraya et al. | |
| 2005/0204343 A1 * | 9/2005 | Kisamore et al. | 717/124 |
| 2005/0257198 A1 | 11/2005 | Stienhans et al. | |
| 2005/0268285 A1 | 12/2005 | Bagley et al. | |
| 2007/0043701 A1 | 2/2007 | Klementiev et al. | |
| 2007/0050710 A1 * | 3/2007 | Redekop | 715/523 |
| 2008/0155354 A1 * | 6/2008 | Kolman | 714/45 |
| 2011/0055704 A9 * | 3/2011 | Guido et al. | 715/733 |

OTHER PUBLICATIONS

WinRunner User's Guide, Version 7.6, 2003.*
WinRunner, User's Guide, Version 7.6, 2003.*
"Collaboration Transparency in the DISCIPLE Framework", Proceedings of the ACM International Conference on Supporting Group Work (GROUP'99), Nov. 14-17, 1999, Phoenix, AZ.*
"Translucent Drag-and-Drop" by Romain Guy, Internet article, Jul. 26, 2007.*
Supporting Mixed Presence Groupware in Tabletop Applications, Hutterer et al., IEEE Computer Society Washington, DC, USA © 2006.*
TestComplete—Functional (GUI) testing http://www.automatedqa.com/products/testcomplete/tc_functional_testing.asp. Last accessed Dec. 11, 2007, 3 pages.
Markus Mikkolainen. Automated Graphical User Interface Testing, Oct. 29, 2006 http://www.cs.helsinki.fi/u/paakki/mikkolainen.pdf. Last accessed Dec. 11, 2007, 13 pages.

* cited by examiner

*Primary Examiner* — Don Wong
*Assistant Examiner* — Daxin Wu
(74) *Attorney, Agent, or Firm* — David W. Grillo (57) ABSTRACT

Real user input targeting an application under test is blocked to prevent interference with a test. A shield window can be placed in front of an application-under-test window to intercept input destined for the application. Users can be notified of interception or a failed attempt to access the application. Furthermore, the shield window can be employed to provide feedback about the test including pointer movement and area focus.

19 Claims, 12 Drawing Sheets

SHIELD FOR USER INTERFACE TESTING

BACKGROUND

Computer programming refers to the process of writing and testing computer programs. Computer programs are groups of instructions specified in one or more programming languages that describe actions to be performed by a computer or other processor-based device. When a computer program is loaded and executed on computer hardware, the computer will behave in a predetermined manner by following the instructions of the computer program. Accordingly, the computer becomes a specialized machine that performs the tasks prescribed by the instructions.

Subsequent to program specification, testing is performed to determine whether or not the program operates as intended. If testing reveals that a program does not operate as intended, for example, where it yields unexpected results, this is likely due to design defects or bugs. In fact, design defects are almost always present in code of any significant size due to the complexity inherent within. Furthermore, correction of defects may introduce new defects into the software. Accordingly, repeated testing is often required to improve the likelihood of early detection and resolution of defects.

Program testing is performed at various levels including at a user interface (UI) or graphical user interface (GUI) level. The interface is the primary way in which users provide input to and receive output from a program. Among other things, testing of UIs involves developing numerous test cases with which to exercise the interface. These test cases are designed to determine how the application will respond to user interaction. UI testing traditionally required a human tester to interact with a UI (e.g., performing mouse-clicks, keyboard entries . . . ) and verify production of expected results. However, such manual testing is time consuming, tedious and subject to human error. Currently, automated testing is much preferred since it enables repeated testing to be performed quickly and efficiently.

In order to automate testing UIs, the tests need to mimic user input and check positioning, color and other details of forms, buttons, menus, dialog boxes, toolbars, and other UI elements. To enable these tests to perform such action, libraries are developed that interact with the UI in such a way that the application cannot distinguish between real user input and input provided by the user. This usually entails sending keyboard and mouse commands to the application using either window messages or accessibility application programming interfaces (APIs).

SUMMARY

The following presents a simplified summary in order to provide a basic understanding of some aspects of the disclosed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the subject disclosure pertains to shielding applications under test from intentional or unintentional injection of input that can negatively affect a test. The reliability of automated UI tests is improved by enabling separation of test input from user input. In accordance with an aspect of the disclosure, this separation can be achieved by employing a shield to block or intercept all input destined for an application under test. In one particular implementation, the shield is embodied as a window positioned in front of a window associated with an application under test. According to another aspect of the disclosure, the shield can be employed to provide feedback about a related test. In one instance, the feedback can include textual and/or graphical information that enables users to monitor activity of the test component visually.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

Systems and methods pertaining to a shield for user interface testing are described in detail hereinafter. UI test reliability can be negatively impacted by real user input such as a mouse movement or key entry as opposed to input from a test. The user and test input can be separated with a shield that blocks user input targeting an application under test. In one embodiment, the shield can be a window that is positioned on top of a window of an application under test. Users can be notified if the shield intercepts any input. Furthermore, the shield can provide feedback about the test.

Various aspects of the subject disclosure are now described with reference to the annexed drawings, wherein like numerals refer to like or corresponding elements throughout. It should be understood, however, that the drawings and detailed description relating thereto are not intended to limit the claimed subject matter to the particular form disclosed.

Rather, the intention is to cover all modifications, equivalents and alternatives falling within the spirit and scope of the claimed subject matter.

Figure 1:
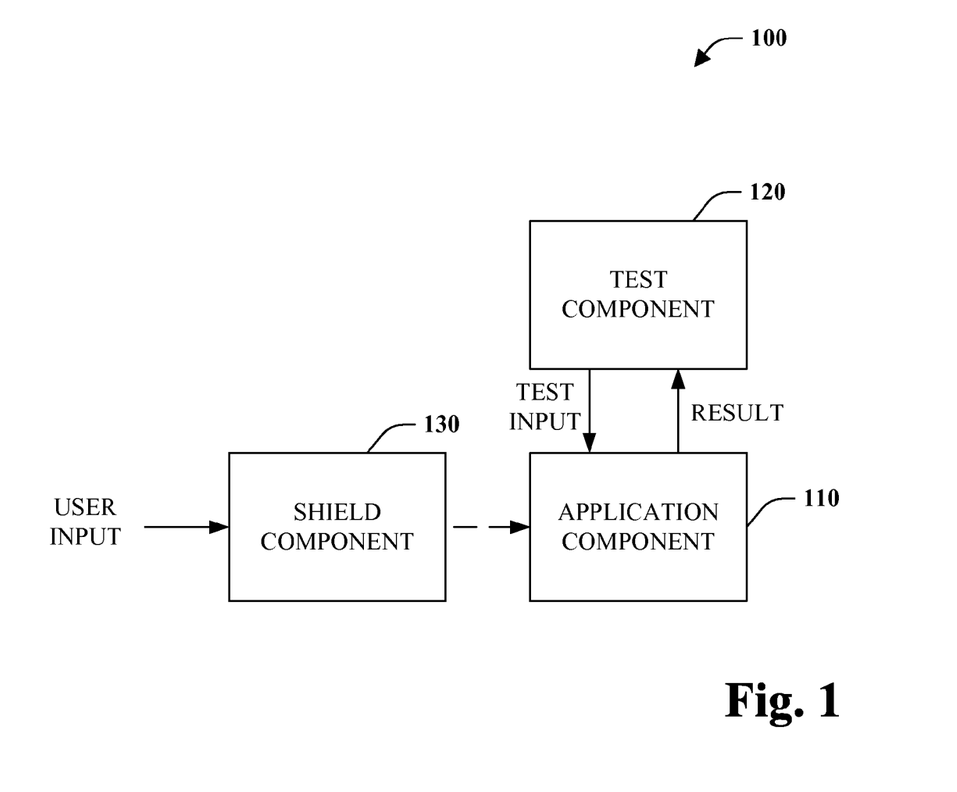
FIG. 1 is a block diagram of an application test system in accordance with an aspect of the disclosure.

Referring initially to FIG. 1, an application testing system 100 is depicted in accordance with an aspect of the claimed subject matter. The system 100 includes an application component 110 such as a user interface (UI) or graphical user interface (GUI). The application component 110 is exercised by test component 120. In particular, the test component 120 provides input to the application component 110 and receives results that it can compare to expected results to determine if the application component is operating as intended. The test input can seek to imitate user input such as moving a mouse, clicking a button, and entering text, among other things.

The system 100 also includes a shield component 130 that shields the application component 110 from intentional or accidental user input for example via a keyboard or pointing device (e.g., mouse, trackball, touchpad . . . ), among other input devices. Without the shield component 130, user input could be injected into the application component 110. This can cause testing problems since the application is being passed test input that it thinks is coming from a real user. Introduction of real user input in addition to the test input can introduce errors in automated testing. The shield component ensures separation of test and user input by blocking or intercepting user input destined for the application component 110. In accordance with one aspect of the disclosure, the shield component 130 can be embodied as a shield window positioned in front of an application window to catch all input directed to the application.

Figure 2:
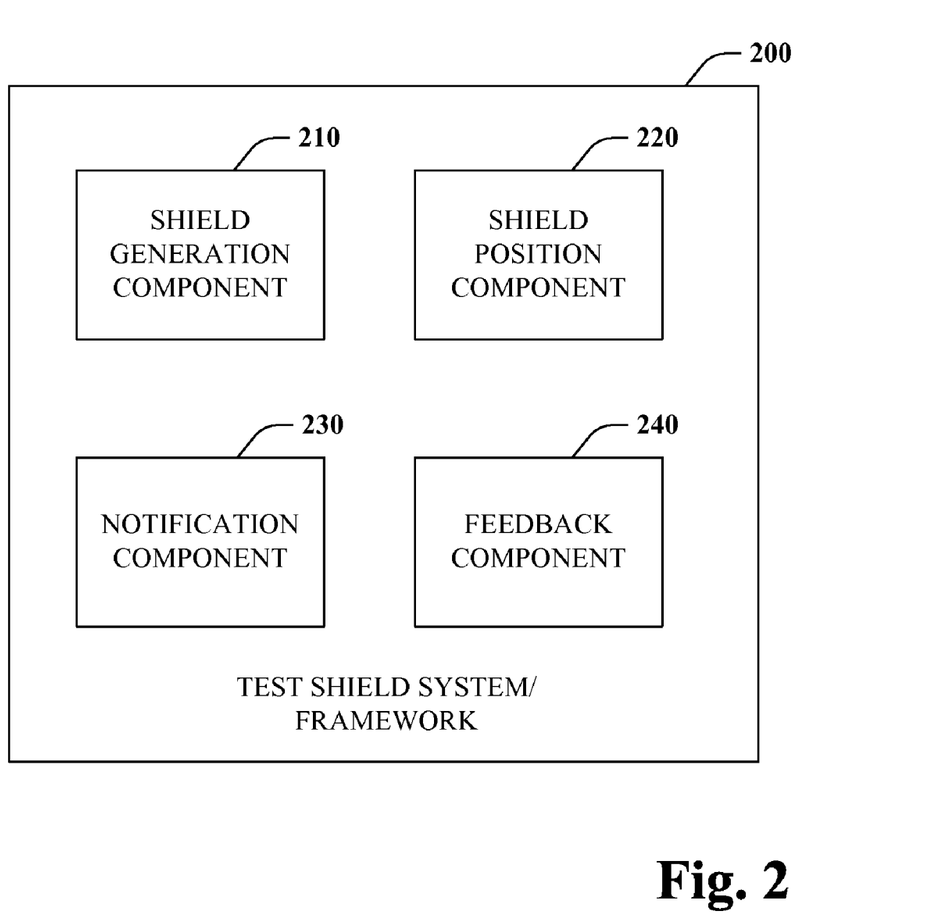
FIG. 2 is a block diagram of a test shield system or framework in accordance with an aspect of the disclosure.

Turning to FIG. 2, a test shield system or framework 200 is illustrated in accordance with an aspect of the claimed subject matter. The system 200 includes a shield generation component 210 to generate or construct a shield. In one instance, the generation component 210 can construct or spawn an application window or a rectangular shaped viewing area on a screen. This shield window is able to receive user input from an input device including but not limited to a keyboard and/or pointing device (e.g., mouse, trackball, touch pad . . . ). The system 200 also includes a shield position component 220 that positions a shield in front an application-under-test window. In this manner, the shield can block or intercept calls targeted intentionally or accidentally for the application under test.

Figure 3:
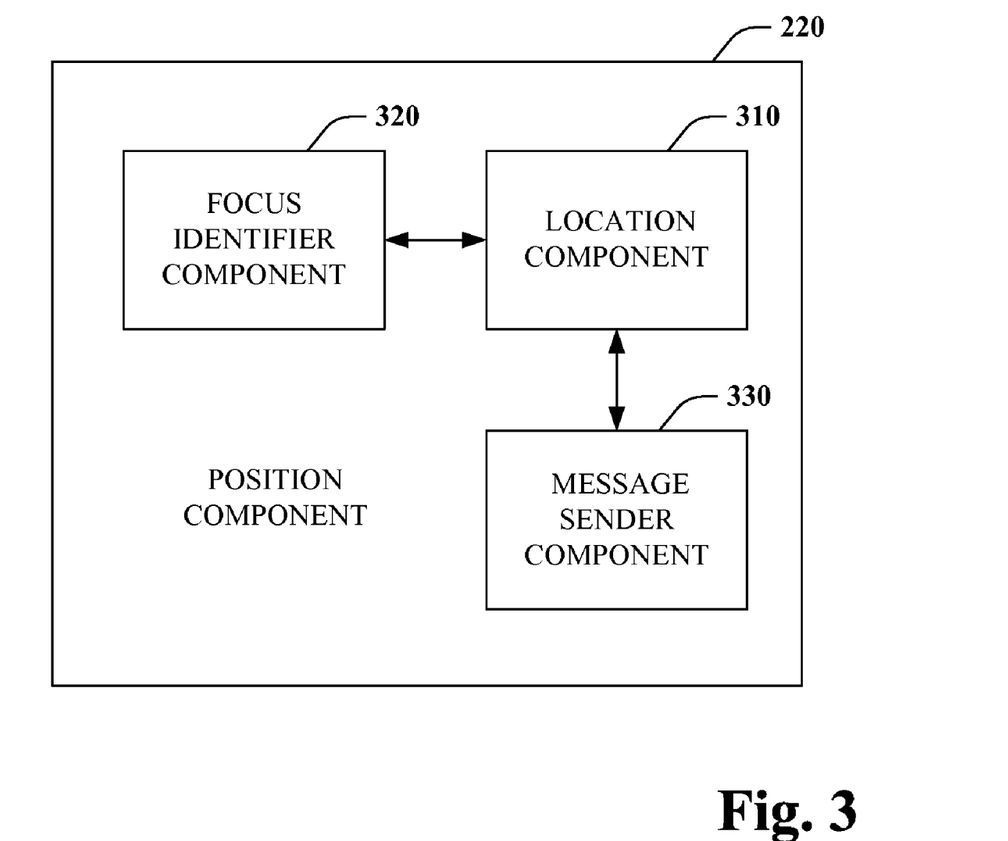
FIG. 3 is a block diagram of a representative position component that positions a shield according to an aspect of the disclosure.

Turning attention to FIG. 3, a representative position component 220 is depicted according to an aspect of the claimed subject matter. The position component 220 includes a number of sub-components to facilitate positioning of a shield window including location component 310, focus identifier component 330, and message sender component 330.

The location component 310 identifies the position and/or size of a window owned by an application under test. This facilitates positioning of a shield window of corresponding size on top of or in front of the application-under-test window, which ensures that only input destined for the window associated with the application under test will be blocked or intercepted. Furthermore, should the test application move and/or resize the window it controls, the position component 120 can ensure that the shield window is adjusted in a similar manner utilizing location component 310.

The focus identifier component 320 determines when an application-under-test window is in focus. In a graphical user interface including multiple application windows, only one window is typically active, or in focus, at a time. Many windows can reside in the background while the window in focus is presented in the foreground. Focus can be changed by clicking on the window or tabbing to the window, among other things. When an application-under-test window is in focus, the focus identifier component 320 can note this and communicate this fact to the location component 310, so that a shield window can be positioned in front of this window.

The message sender component 330 communicates a message to the application-under-test window informing it that it is in the foreground. When an application-under-test window is in focus, a shield window is positioned in the foreground in front of the application window to block input thereto, among other things. However, in accordance with a disclosed aspect, the application can be made unaware of the shield window by sending a fake window message to the application indicating that it is in the foreground when in fact it is not.

Figure 4:
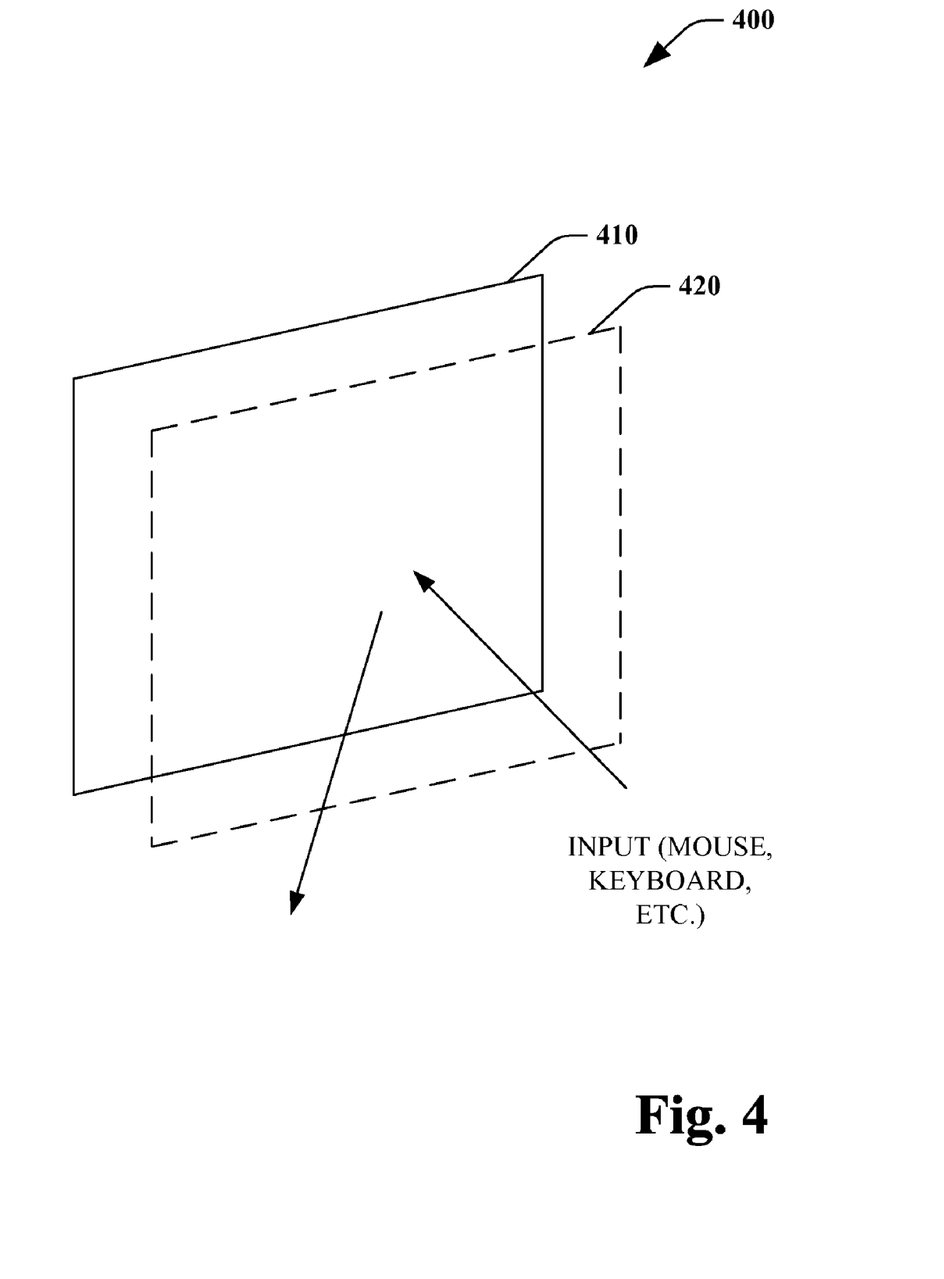
FIG. 4 is an exemplary graphical illustration of a shielded application under test in accordance with a disclosed aspect.

FIG. 4 provides an exemplary graphical representation of a shielded application under test 400. Window 410 represents that owned or controlled by an application under test, while window 420 corresponds to a shield window. As shown, the shield window 420 of substantially the same size is positioned in front of, or on top of, the application-under-test window 410. As a result, any input from a mouse or keyboard, for example, destined for the application-under-test window 410 is blocked, intercepted, or absorbed by the shield window 420. Consequently, the application under test can execute solely with respect to test input without interference from intentional or accidental user input.

Returning to FIG. 2, the test shield system 200 can also include a notification component 230. The notification component 230 can notify, or initiate notification of, a user in the event that input is blocked by a shield. The notification can indicate to the user that input targeting an application under test was not sent to the application but rather intercepted by the shield. Furthermore, the notification component 230 can provide or direct a user to a mechanism to disable the shield at least temporarily. For example, if a user notices that a test is failing, he/she could disable the protection to enable them to interact with the application under test. Subsequently, the protection can be re-enabled explicitly, upon expiration of a time period or detection of some other action.

The test shield system 200 can also include a feedback component 240 that provides information about a test. Among other things, the feedback can include information concerning mouse movements, active areas, and test progress, among other things. In accordance with an aspect of the disclosure, the feedback component 240 can present feedback in or on a shield window.

Figure 5:
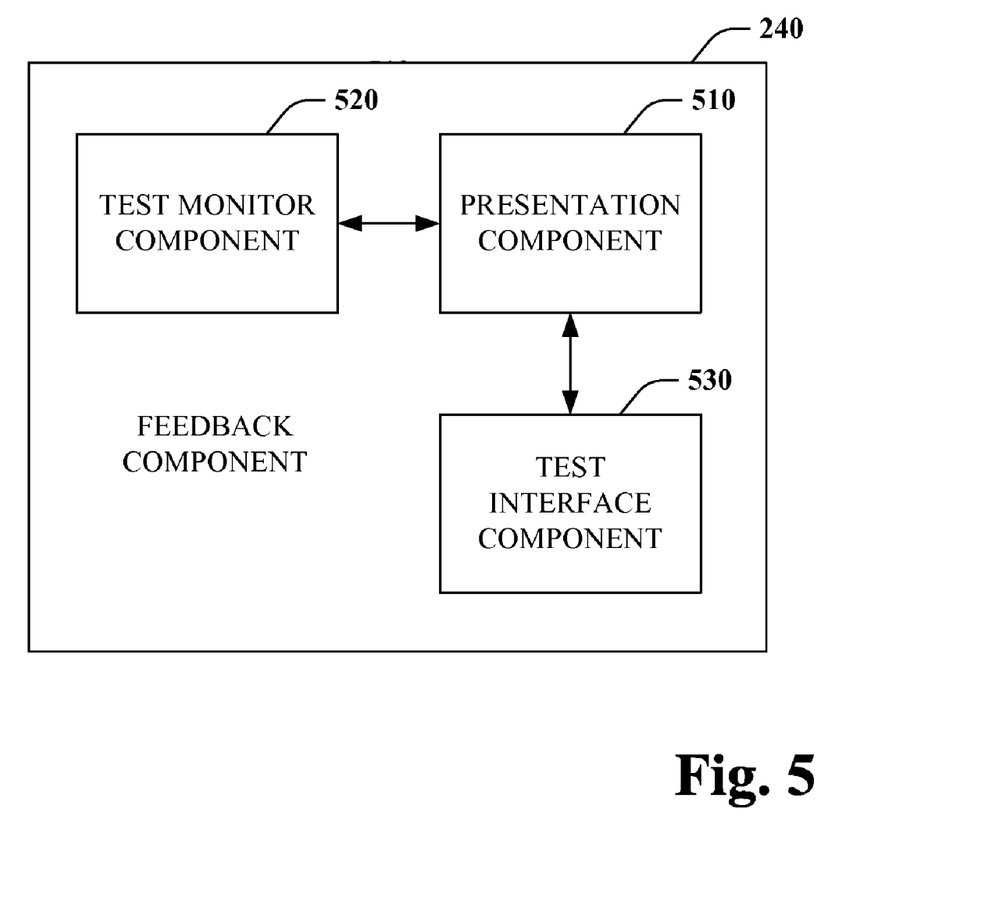
FIG. 5 is a block diagram of a representative feedback component according to an aspect of the disclosure.

Turning attention to FIG. 5, a representative feedback component 240 is illustrated in accordance with the claimed subject matter. The feedback component 240 includes a presentation component 510 to render feedback to a shield window, for example. The presentation component 510 can support display of text, graphics, images, and animations, amongst others. The presentation component 510 can include such rendering functionality and/or call an application-programming interface (API) or the like that includes needed presentation functionality. The presentation component 510 can receive data for rendering from test monitor component 520 and test interface component 530.

The test monitor component 520 monitors a test and the messages being sent to the application under test. In some instances, where a particular UI element needs to be observed a test will use window messages. For example, one or more window messages can move a mouse pointer over to a button and click it. However, in some instances, a test can emulate particular user input without providing feedback. For instance, a mouse pointer does not move but suddenly a button is clicked. The test monitor component 520 can identify these types of instructions or messages and provide the information to the presentation component 510 which can draw a mouse cursor on the shield component and animate the same movement that was sent to the application but not displayed. In one instance, the mouse can be differentiated by color or other means to distinguish it from the main mouse pointer.

Similarly, the test monitor component 520 can monitor test instructions and determine an active element. This information can also be provided to the presentation component 510, which can highlight the active element. By way of example, a test may say type text into a particular text box. From the instruction, the identity of the text box is known. The location and size of the text box can then be requested or otherwise determined, and a border can be drawn around the text box in some distinguishing color (e.g., yellow, red . . . ), for instance, to indicate to a user that text is being typed into this box so that he/she can focus attention on that element if he/she is trying to determine test action.

The test interface component 530 provides a mechanism to interface with the feedback component 240. In one instance, a test can utilize this interface to identify or provide information about what it is doing with an application for presentation in a shield window. For example, the test can provide test progress information such as the time remaining, the tests performed, and/or the result of tests, among other things. Additionally or alternatively, the test might indicate that it desires rendering of a custom thing.

Consider a situation where a test is performing a "drag-and-drop" action on the application under test. The presentation component 510 might be capable of displaying the execution such action on the shield. Alternatively, if such a user interface element or action is not supported, a user can be alerted to such action via a text messages displayed on the shield. Still further yet, the presentation component 510 can instruct the test to take control of drawing an indication of this action inside the shield.

Figure 6:
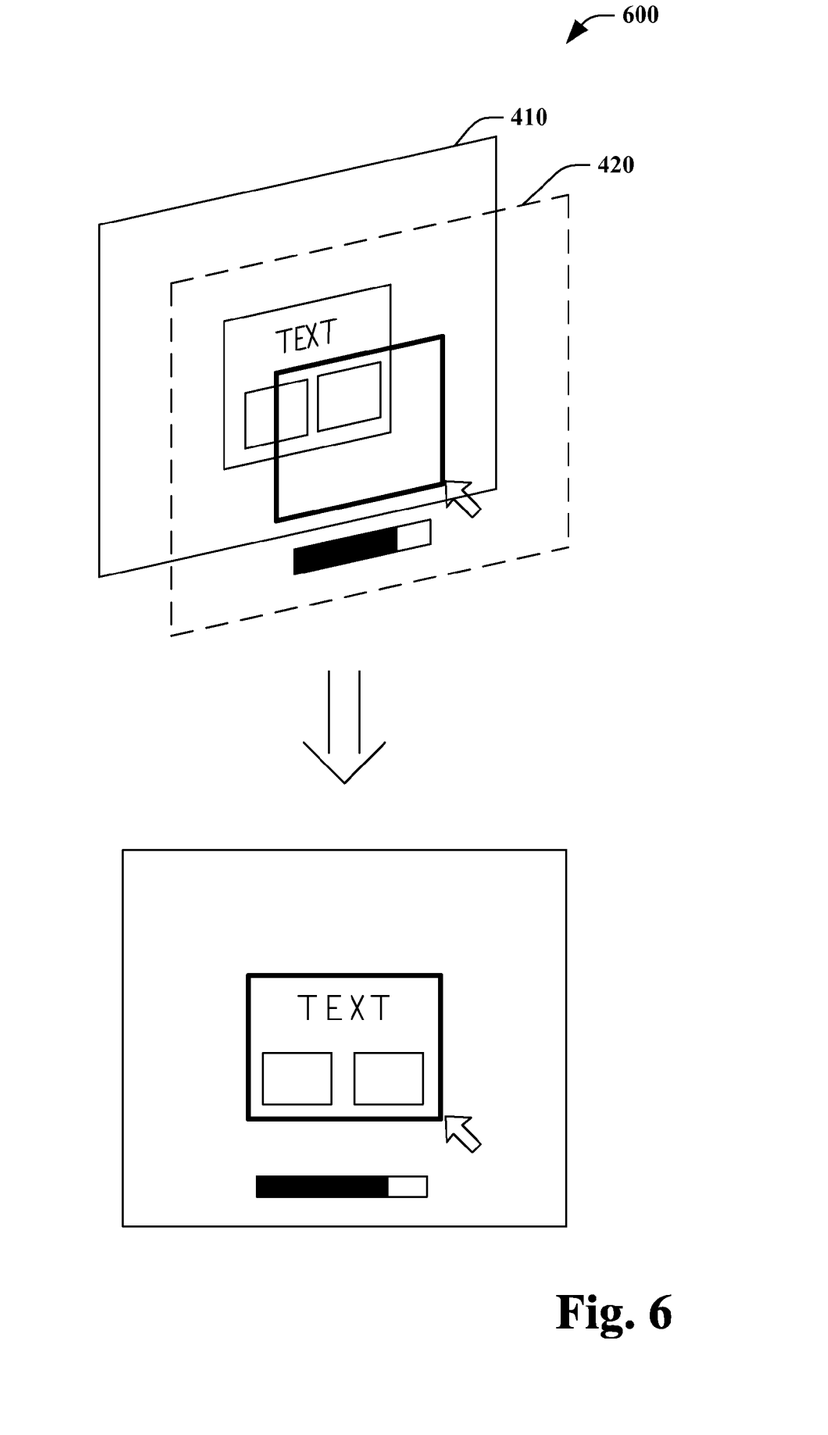
FIG. 6 is an exemplary graphical illustration of an employment of feedback in combination with a shield in accordance with a disclosed aspect.

Referring to FIG. 6, an exemplary graphical interface illustrating utilization of feedback 600 is depicted in accordance with an aspect of this disclosure. As shown, the application-under-test window 410 displays a box including some text and two smaller boxes representing buttons, perhaps, in the middle of the window. The shield window 420 is substantially transparent or invisible and operable to block or intercept input destined for the application-under-test window. Moreover, the shield window 420 displays test feedback information. In particular, the shield window 420 includes a rectangle of the same size as the box displayed by the application-under-test window of sizeable line width. Additionally, the shield window 420 includes a graphical depiction of a mouse pointer that can be moved around the shield window 420 in response to test action. Still further yet, the shield window includes a progress bar illustrating a percentage of test completed or conversely the amount of testing left to be performed. The combination of application-under-test 410 and shield window 420 affords protection against undesired input and enhances the test feedback making it easier for users to understand what the test is doing. For instance, the layering of the transparent or semi-transparent shield window 420 including a visible rectangular box on top of the application-under-test window 410, acts to highlight the application box as active.

The aforementioned systems, architectures, and the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component to provide aggregate functionality. Communication between systems, components and/or sub-components can be accomplished in accordance with either a push and/or pull model. The components may also interact with one or more other components not specifically described herein for the sake of brevity, but known by those of skill in the art.

Furthermore, as will be appreciated, various portions of the disclosed systems above and methods below can include or consist of artificial intelligence, machine learning, or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. By way of example and not limitation, the location component 310 can employ such mechanisms to infer application-under-test window location.

In view of the exemplary systems described supra, methodologies that may be implemented in accordance with the disclosed subject matter will be better appreciated with reference to the flow charts of FIGS. 7-10. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

Figure 7:
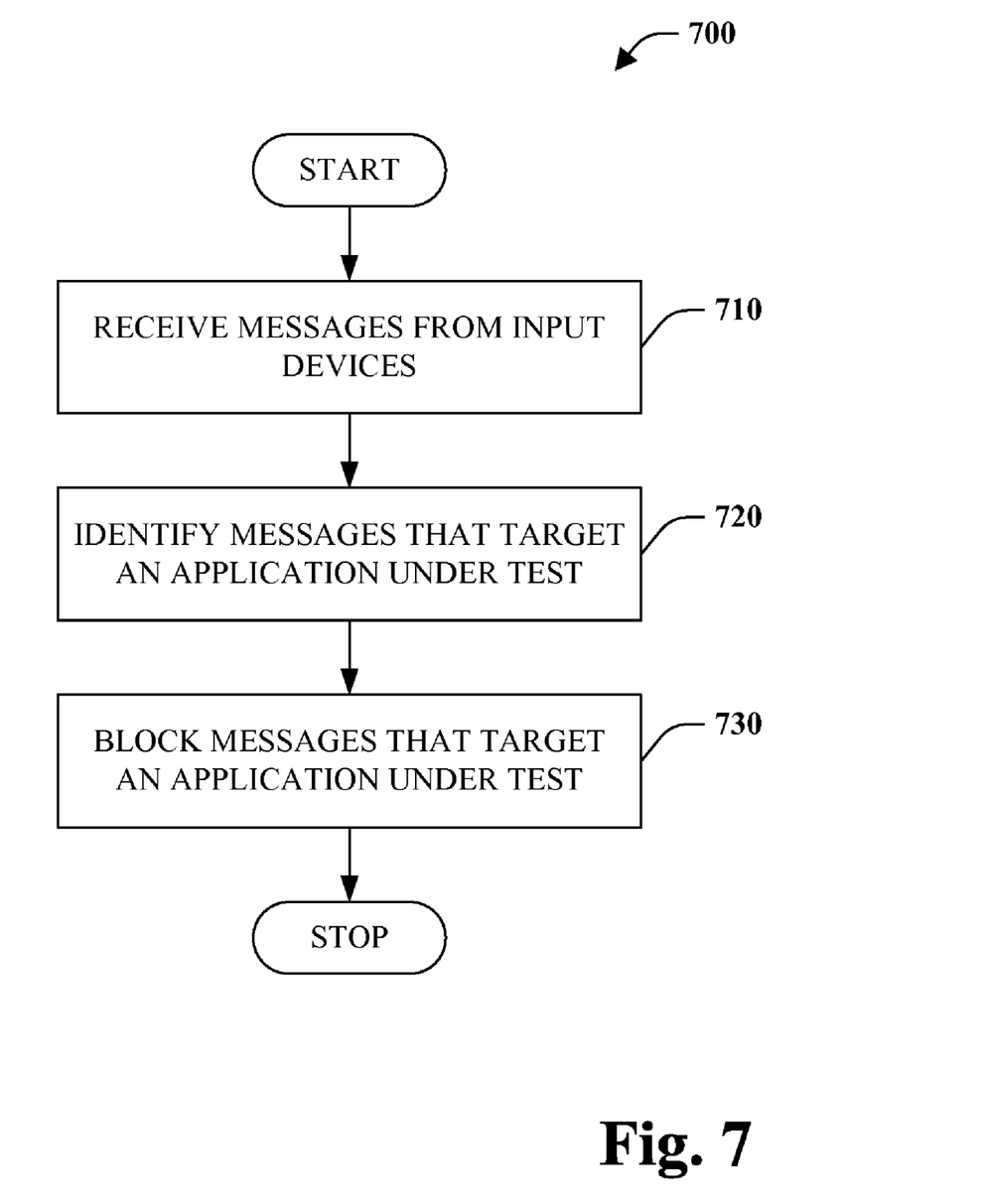
FIG. 7 is a flow chart diagram of a method of shielding application under test according to an aspect of the disclosed subject matter.

Referring to FIG. 7, a method for shielding applications under test 700 is depicted in accordance with an aspect of the claimed subject matter. At reference numeral 710, messages are received from one or more input devices including but not limited to a keyboard and a pointing device (e.g., mouse, trackball, touchpad . . . ). At numeral 720, messages that target an application under test are identified. For example, where an application-under-test window is determined to be in focus, active, or brought to the foreground, input received can be identified as targeting the application under test. The messages identified as targeting an application under test are blocked at numeral 730. In other words, method 700 provides a mechanism to filter input. Any input bound for an application under test is blocked while all other input is allowed. This enables users to continue to utilize a machine and applications thereon without accidently injecting problems into an application under test.

Figure 8:
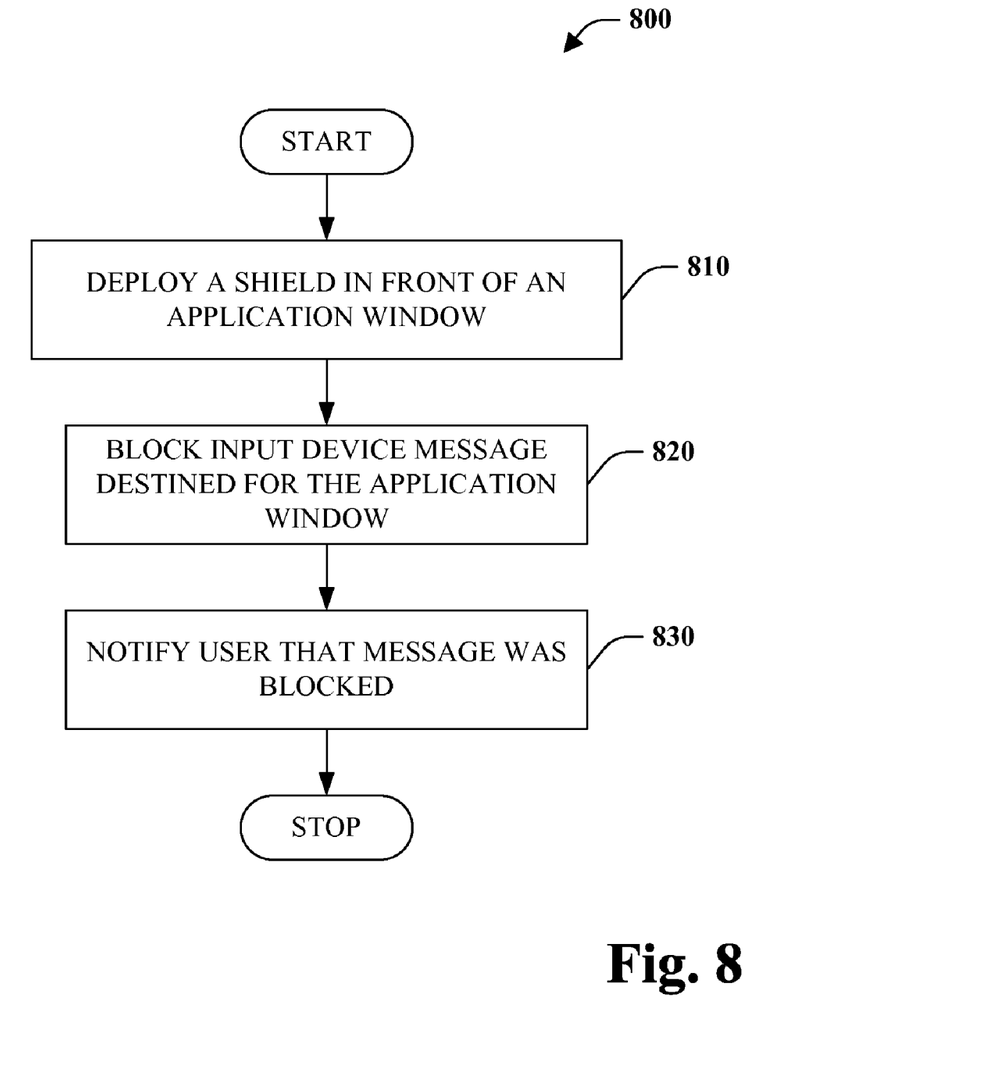
FIG. 8 is a flow chart diagram of a method of protecting applications under test with a shield window in accordance with an aspect of the disclosure.

FIG. 8 depicts a method 800 of application protection employing a shield window. At reference numeral 810, a shield window is deployed in front of another window such as an application-under-test window. In one instance, the shield window can be substantially transparent or invisible. However, the shield can be visible so that users are aware of its presence. At numeral 820, input destined for the application window is blocked or intercepted by the shield window. A notification can be produced at 830 notifying a user that input targeting the application window was not sent to the window but rather blocked by the shield. This can prevent accidental injection of input into an application window. Of course, if input is really desired to reach the application window, the shield can be turned off.

Figure 9:
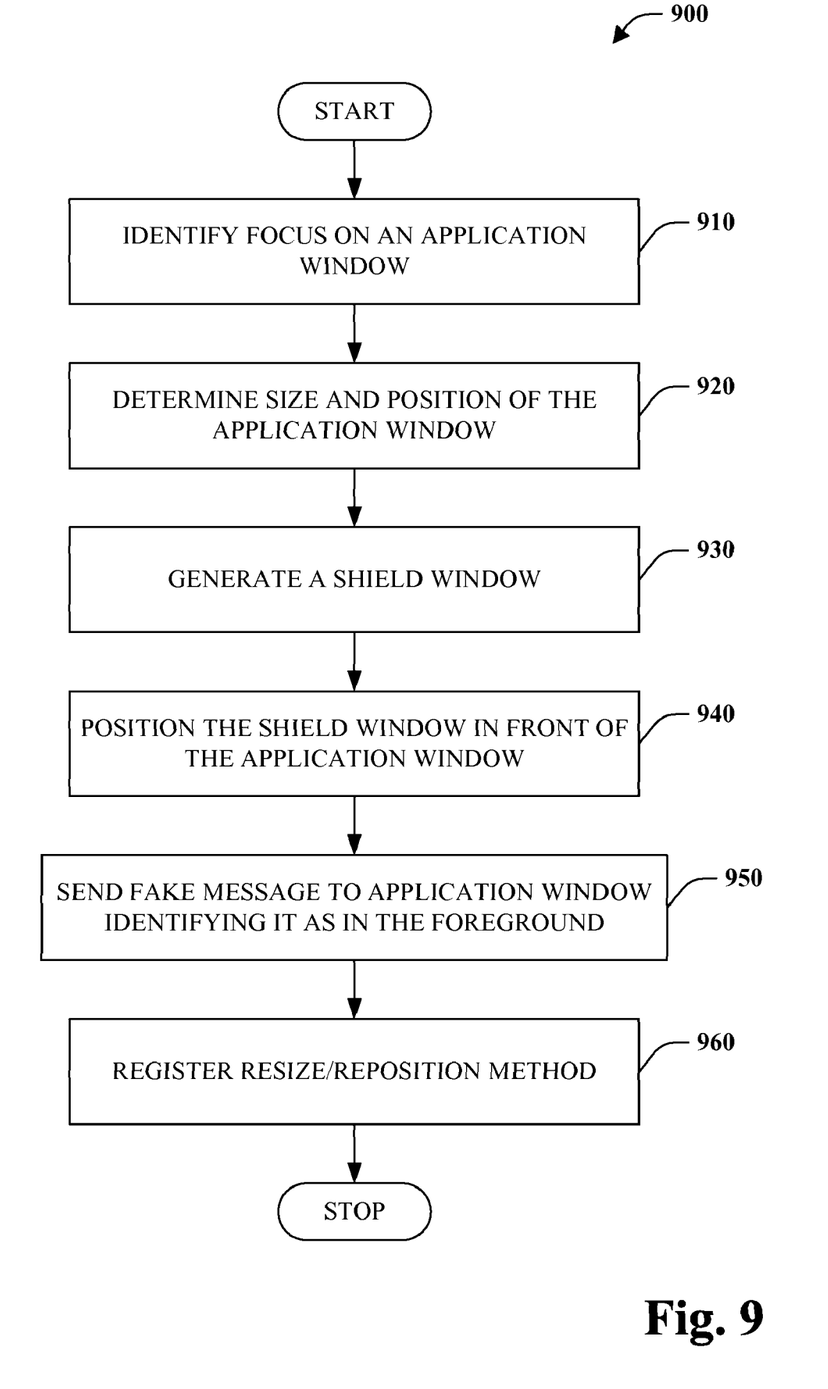
FIG. 9 is a flow chart diagram of a method of shield window deployment in accordance with an aspect of the disclosure.

Referring to FIG. 9, a shield deployment method 900 is illustrated in accordance with an aspect of the claimed subject matter. At reference numeral 910, a focus is identified on an application window desired to be protected such an application-under-test window. For example, a user can click on or tab to such a window to bring focus thereto. Additionally or alternatively, an application window may come into focus automatically, upon initial execution, for instance. At numeral 920, the size and position of the application window is determined. This can be done, for example, employing application programming interface (API) provided by a platform. At reference 930, a shield window is generated, if not generated previously. The shield window can be an opaque, transparent, or semi-transparent window. In one implementation, this can be accomplished by a simple operating system or platform call. The shield window of the same size is positioned in front of the application window at reference numeral 940 to enable interception of calls to the application window, among other things. At reference 950, a fake message is passed to the application window indicating that it is in the foreground, thereby making it unaware or independent of the application window. At numeral 950, a method is registered with an event such that if the size or position of the application window changes the shield window changes as well. This ensures that the shield window captures all input directed to the application window and nothing more. Otherwise, the application window could move as part of the test and a user could inject input into the window. Alternatively, the shield could capture input for a different application window.

Figure 10:
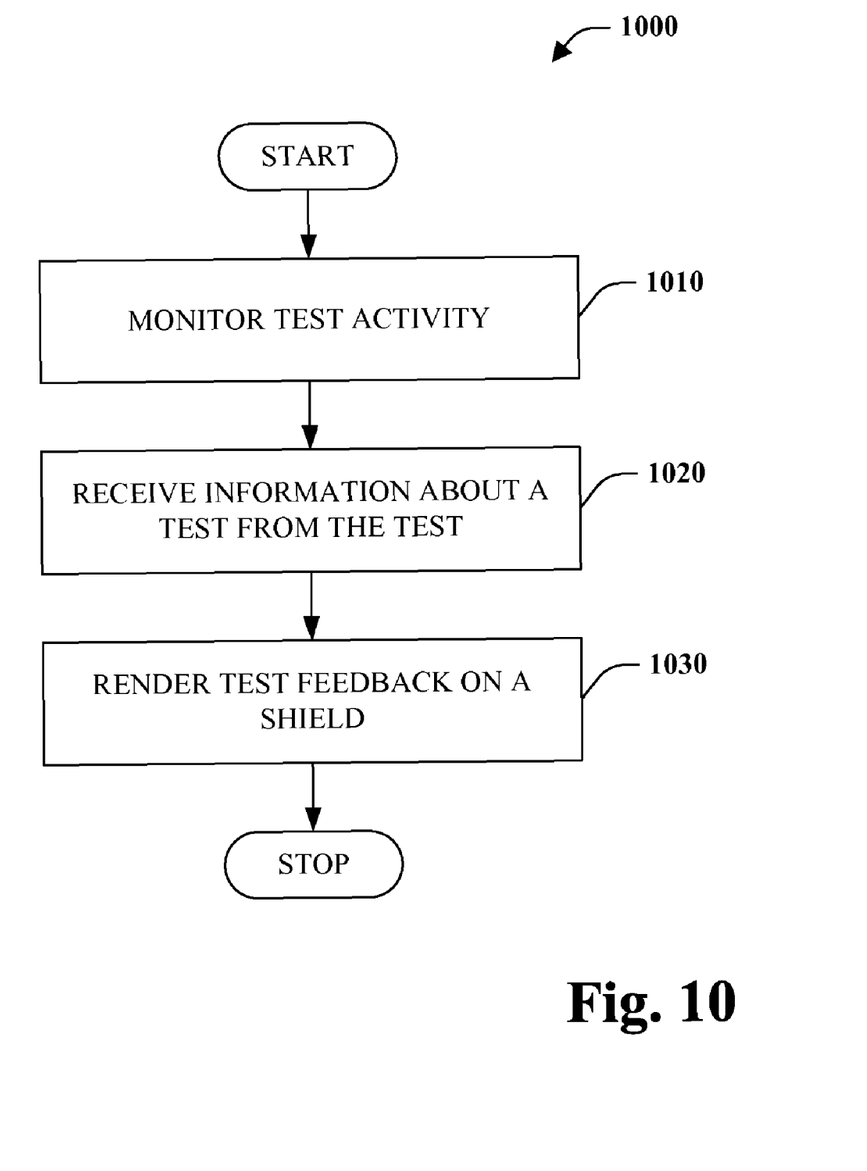
FIG. 10 is a flow chart diagram of a feedback method in accordance with a disclosed aspect.

FIG. 10 is a flow chart diagram of a feedback method 1000 according to an aspect of the claimed subject matter. At reference numeral 1010, a test activity is monitored for a protected application. In particular, window messages and other instructions provided to an application under test can be monitored. At numeral 1020, information is received about a test from the test itself. At reference numeral 1030, test feedback received from a test and acquired through monitoring is rendered to a shield window. In this manner, much information about a test can be provided on top of the application under test. For instance, the test can provide progress information for rendering such as the number of tests ran, the number of test left, and/or test results, among other things. In one implementation, rendered feedback can seek to enable visual observation of test activity. For instance, a mouse can be drawn and animated and/or active graphical elements highlighted on the shield window.

It is to be noted that while the shield systems and methods described above are particularly useful in a test context, the disclosed subject matter is not limited to the testing domain. The shield window and associated support mechanisms can be employed with respect to any application or application window that one desires to protect from injection of input. In one particular instance, the shield can be utilized as a security mechanism to protect any graphical element from modification. In this scenario, security credentials can be required and employed to activate and deactivate the shield.

The word "exemplary" or various forms thereof are used herein to mean serving as an example, instance, or illustration. Any aspect or design described herein as "exemplary" is not necessarily to be construed as preferred or advantageous over other aspects or designs. Furthermore, examples are provided solely for purposes of clarity and understanding and are not meant to limit or restrict the claimed subject matter or relevant portions of this disclosure in any manner. It is to be appreciated that a myriad of additional or alternate examples of varying scope could have been presented, but have been omitted for purposes of brevity.

As used herein, the term "inference" or "infer" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the subject innovation.

Furthermore, all or portions of the subject innovation may be implemented as a method, apparatus or article of manufacture using standard programming and/or engineering techniques to produce software, firmware, hardware, or any combination thereof to control a computer to implement the disclosed innovation. The term "article of manufacture" as used herein is intended to encompass a computer program accessible from any computer-readable device or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Figure 11:
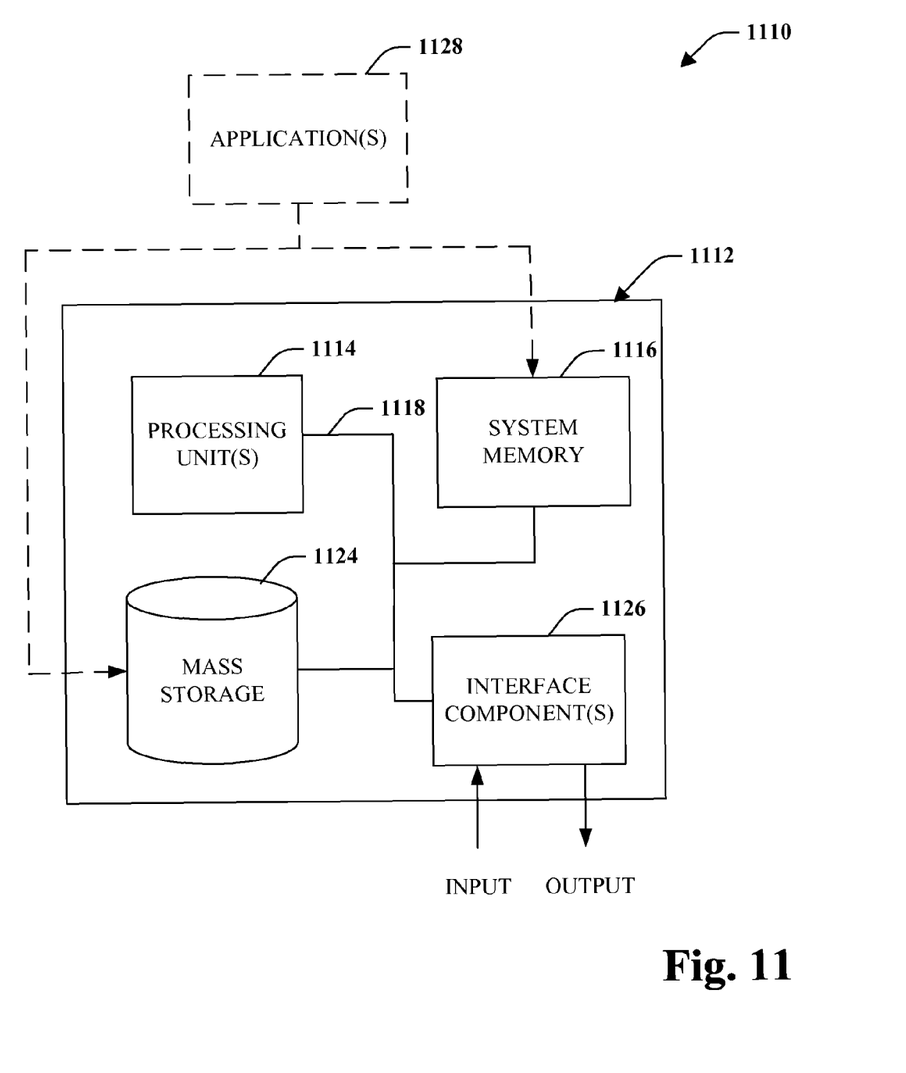
FIG. 11 is a schematic block diagram illustrating a suitable operating environment for aspects of the subject disclosure.
Figure 12:
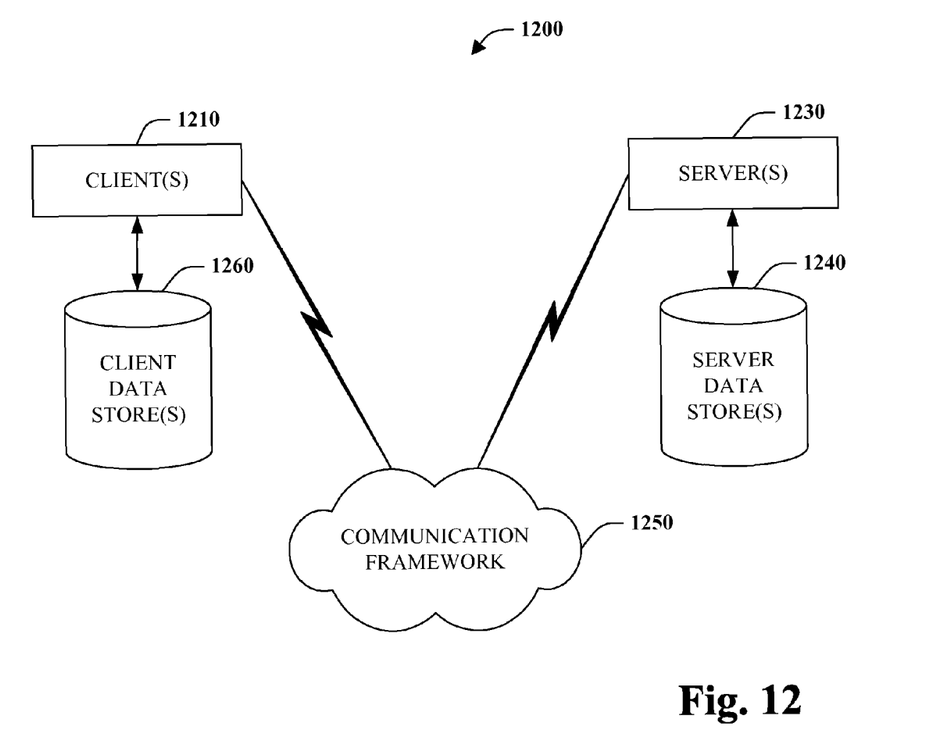
FIG. 12 is a schematic block diagram of a sample-computing environment.

In order to provide a context for the various aspects of the disclosed subject matter, FIGS. 11 and 12 as well as the following discussion are intended to provide a brief, general description of a suitable environment in which the various aspects of the disclosed subject matter may be implemented. While the subject matter has been described above in the general context of computer-executable instructions of a program that runs on one or more computers, those skilled in the art will recognize that the subject innovation also may be implemented in combination with other program modules. Generally, program modules include routines, programs, components, data structures, etc. that perform particular tasks and/or implement particular abstract data types. Moreover, those skilled in the art will appreciate that the systems/methods may be practiced with other computer system configurations, including single-processor, multiprocessor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the claimed subject matter can be practiced on stand-alone computers. In a distributed computing environment, program modules may be located in both local and remote memory storage devices.

With reference to FIG. 11, an exemplary environment 1110 for implementing various aspects disclosed herein includes a computer 1112 (e.g., desktop, laptop, server, hand held, programmable consumer or industrial electronics . . . ). The computer 1112 includes a processing unit 1114, a system memory 1116, and a system bus 1118. The system bus 1118 couples system components including, but not limited to, the system memory 1116 to the processing unit 1114. The processing unit 1114 can be any of various available microprocessors. It is to be appreciated that dual microprocessors, multi-core and other multiprocessor architectures can be employed as the processing unit 1114.

The system memory 1116 includes volatile and nonvolatile memory. The basic input/output system (BIOS), containing the basic routines to transfer information between elements within the computer 1112, such as during start-up, is stored in nonvolatile memory. By way of illustration, and not limitation, nonvolatile memory can include read only memory (ROM). Volatile memory includes random access memory (RAM), which can act as external cache memory to facilitate processing.

Computer 1112 also includes removable/non-removable, volatile/non-volatile computer storage media. FIG. 11 illustrates, for example, mass storage 1124. Mass storage 1124 includes, but is not limited to, devices like a magnetic or optical disk drive, floppy disk drive, flash memory, or memory stick. In addition, mass storage 1124 can include storage media separately or in combination with other storage media.

FIG. 11 provides software application(s) 1128 that act as an intermediary between users and/or other computers and the basic computer resources described in suitable operating environment 1110. Such software application(s) 1128 include one or both of system and application software. System software can include an operating system, which can be stored on mass storage 1124, that acts to control and allocate resources of the computer system 1112. Application software takes advantage of the management of resources by system software through program modules and data stored on either or both of system memory 1116 and mass storage 1124.

The computer 1112 also includes one or more interface components 1126 that are communicatively coupled to the bus 1118 and facilitate interaction with the computer 1112. By way of example, the interface component 1126 can be a port (e.g., serial, parallel, PCMCIA, USB, FireWire . . . ) or an interface card (e.g., sound, video, network . . . ) or the like. The interface component 1126 can receive input and provide output (wired or wirelessly). For instance, input can be received from devices including but not limited to, a pointing device such as a mouse, trackball, stylus, touch pad, keyboard, microphone, joystick, game pad, satellite dish, scanner, camera, other computer and the like. Output can also be supplied by the computer 1112 to output device(s) via interface component 1126. Output devices can include displays (e.g., CRT, LCD, plasma . . . ), speakers, printers and other computers, among other things.

FIG. 12 is a schematic block diagram of a sample-computing environment 1200 with which the subject innovation can interact. The system 1200 includes one or more client(s) 1210. The client(s) 1210 can be hardware and/or software (e.g., threads, processes, computing devices). The system 1200 also includes one or more server(s) 1230. Thus, system 1200 can correspond to a two-tier client server model or a multi-tier model (e.g., client, middle tier server, data server), amongst other models. The server(s) 1230 can also be hardware and/or software (e.g., threads, processes, computing devices). The servers 1230 can house threads to perform transformations by employing the aspects of the subject innovation, for example. One possible communication between a client 1210 and a server 1230 may be in the form of a data packet transmitted between two or more computer processes.

The system 1200 includes a communication framework 1250 that can be employed to facilitate communications between the client(s) 1210 and the server(s) 1230. The client(s) 1210 are operatively connected to one or more client data store(s) 1260 that can be employed to store information local to the client(s) 1210. Similarly, the server(s) 1230 are operatively connected to one or more server data store(s) 1240 that can be employed to store information local to the servers 1230.

Client/server interactions can be utilized with respect with respect to various aspects of the claimed subject matter. By way of example and not limitation, applications under test can be network base applications that execute in a browser window that is shielded. Furthermore, the shield system can be network based or a client application that is downloaded from a server 1230 to a client 1210 across the communication framework 1250.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

What is claimed is:

1. A test shield system, comprising:
a processor coupled to a memory, the processor configured to execute the following computer-executable components stored in the memory:
a generation component configured to generate a shield window; and
a position component configured to position the shield window in front of an active application-under-test window to intercept user input destined for the application under test.

2. The system of claim 1, further comprising a location component configured to identify a screen location of the application to facilitate positioning of the shield window.

3. The system of claim 1, further comprising a notification component configured to notify a user that input was intercepted.

4. The system of claim 1, the shield window is transparent.

5. The system of claim 4, further comprising a feedback component configured to provide test feedback on the shield window.

6. The system of claim 5, the feedback includes position and/or movement of a pointer or cursor as a function of test activity.

7. The system of claim 5, the feedback includes identification of test focus area that includes an active element under test.

8. The system of claim 5, further comprising an interface component configured to enable tests to provide information about test progress in the shield window.

9. A method of reliable application testing, comprising:
employing at least one processor configured to execute computer-executable instructions stored in memory to perform the following acts:
deploying a transparent window in front of an active application-under-test window; and
blocking an input device message bound for the application under test with the transparent window.

10. The method of claim 9, further comprising determining size and location of the application-under-test window.

11. The method of claim 9, further comprising repositioning and/or resizing the transparent window in response to changes in the application-under-test window.

12. The method of claim 9, further comprising notifying a user that the input device message was blocked.

13. The method of claim 9, further comprising providing test feedback in the transparent window.

14. The method of claim 13, further comprising:
monitoring the application under test; and
presenting graphic representations of test actions in the transparent window.

15. The method of claim 14, comprising animating pointer movement, and/or highlighting an area of test focus.

16. The method of claim 13, further comprising receiving the feedback from a test.

17. The method of claim 9, further comprising indicating to the application-under-test window that it is in the foreground despite the transparent window residing in the foreground.

18. A method that facilitates user interface (UI) testing, comprising:
employing at least one processor configured to execute computer-executable instructions stored in memory to perform the following acts:
intercepting a pointer or keyboard message destined for an active application-under-test window with a transparent window positioned over top of the application-under-test window; and
providing test feedback through the transparent window.

19. The method of claim 18, further comprising notifying a user that the message was intercepted and failed to reach the application.

* * * * *